(No Model.)

P. J. DALTON.
POWER APPARATUS.

No. 433,771. Patented Aug. 5, 1890.

WITNESSES:
Paul Jahst
C. Sedgwick

INVENTOR:
P. J. Dalton
BY
Munn & Co.
ATTORNEYS

UNITED STATES PATENT OFFICE.

PATRICK J. DALTON, OF NEW YORK, N. Y.

POWER APPARATUS.

SPECIFICATION forming part of Letters Patent No. 433,771, dated August 5, 1890.

Application filed March 14, 1890. Serial No. 343,862. (No model.)

*To all whom it may concern:*

Be it known that I, PATRICK J. DALTON, of New York city, in the county and State of New York, have invented new and useful Improvements in Power Apparatus, of which the following is a full, clear, and exact description.

My invention relates to power apparatus adapted for operation by a "head" of water or pressure of other fluid from any source of supply, and has for its object to provide a simple, compact, and efficient apparatus of this class capable of a large amount of work through the medium of wheels or other power-transmitting motors operated by the fluid fed under pressure to a main reservoir and passing thence to the wheels or motors.

The invention consists in certain novel features of construction and combination of parts of the power apparatus, all as hereinafter described and claimed.

Reference is to be had to the accompanying drawings, forming a part of this specification, in which similar letters of reference indicate corresponding parts in all the figures.

Figure 1 is a longitudinal vertical sectional view of my improved power apparatus, taken on the line $xx$ in Fig. 2. Fig. 2 is a plan view, partly broken away and partly in section, on line $y$ $y$ in Fig. 1; and Fig. 3 is a vertical transverse section of the apparatus, taken on line $z$ $z$ in Fig. 2.

My improved apparatus, while having great power-exerting capacity, is very simple in construction, and, generally speaking, consists of a main fluid-reservoir A, a flume or conduit B supplying it, and an outlet or exhaust chamber C, which surrounds the reservoir and makes an efficient brace or stay for it, and also provides support to a series of wheels D, preferably turbine wheels, which are supplied from the main tank and discharge into the exhaust-chamber, and are or may be geared to power-transmitting shafts which give motion to any connected machinery.

I prefer to make the main reservoir A of two or more separate cubical tanks or chambers, three tanks $a$ $a$ $a$ being shown placed side by side in a row and laid upon and secured to a stone or other suitable foundation, the bottoms of the tanks being preferably sunken below the ground surface G, which, or the foundation itself, thus braces the lower part of the reservoir against internal burst-ing-pressure. The abutting walls $a'$ of the three tanks are bolted together, and preferably have central openings $a^2$ about ten feet square, (more or less,) to give free fluid communication between all three tanks, which thus form a common main fluid-reservoir. I purpose making each tank $a$ about twenty feet square, and as the three together are sixty feet long the reservoir has a large capacity—so large that the weight of water or fluid in it will prevent upsetting of it by the volume or pressure of the fluid filling it from the flume B. The abutting tank-walls $a'$, which are bolted together, make very substantial transverse braces to the reservoir.

The flume B may either be a stone conduit or a pipe-line and will incline downward from any source of water-supply—a waterfall, for instance—to the main reservoir, with which it connects, preferably at its center, by a passage $b$ about ten feet square, which opens into or through the floor of the center tank $a$ of the reservoir. The drawings show the water-supply flume built of stone; but it may be made of metal, wood, or any other suitable material or materials.

The water-wheel-exhaust-receiving chamber C may be built of any suitable material, such as wood, stone, or metal. I show it built of metal and resting, preferably, on a stone foundation level with the ground surface, or about three feet above the bottom of the main reservoir A, to raise the chamber, which is about ten feet square in cross-section, so that it makes a most efficient brace or stay to the outside walls of the reservoir, which it fits all around, to materially strengthen it against internal bursting-pressure. A suitable flume or sluiceway $c$ conducts the waste or exhaust water received from the water-wheels to any proper place of discharge. The exhaust-water chamber C not only makes a surrounding brace to the main reservoir, but its disposal in this manner allows it to be utilized as a substantial base or foundation to the entire series of water or turbine wheels D employed in the apparatus. It will be noticed that the main reservoir projects above the exhaust-chamber in the preferred construction, thus allowing the feed or inlet pipes $d$, which open from the reservoir to the water-wheel casings, to be run straight from the reservoir to the casings for driving the wheels by the pressure of water flowing or being forced under high pressure from the reservoir, while at the same time allowing the bottom wheel exhaust outlets or pipes $d'$ to be connected to and discharge directly through the top of the exhaust-chamber C into its interior, and thence to the waste flume or sluice. As many water-wheels, preferably turbines, may be used as the size of the hydraulic power apparatus or the special work it is to do may require. Where the water-supply is practically unlimited and the head in the supply-flume is sufficient, one hundred or more water-wheels may be supplied and run from the common fluid-reservoir, and each wheel, when a turbine D, will preferably be geared by bevel-wheels E with a shaft F, which may have any required number of pulleys $f$ receiving belts, which may transmit the power to dynamos for electric lighting or power purposes, or to any other heavy or light machinery set up in buildings close to or at a distance from the power apparatus.

The power of each water-wheel or of any required number of them may be transmitted in any other manner than that shown and above described. In fact, the wheels themselves are not necessarily turbine wheels, but may have any approved construction adapted to be supplied with water from the main reservoir and to exhaust into the chamber C, which surrounds it.

Any other suitable fluid under pressure may be used instead of water, as will readily be understood.

Having thus described my invention, I claim as new and desire to secure by Letters Patent—

1. In a power apparatus, the combination, with a main fluid-reservoir and a source of supply thereto, of a tank or chamber surrounding and bracing the reservoir and adapted to receive the exhaust of motors operated by fluid from the reservoir, substantially as herein set forth.

2. In a power apparatus, the combination, with a main fluid-reservoir having a source of supply and set into the ground or a foundation to provide thereby an outside brace to its lower part, of a tank or chamber surrounding the reservoir and forming an additional brace or stay thereto and adapted to receive the exhaust of motors driven by fluid from the reservoir, substantially as herein set forth.

3. In a power apparatus, the combination, with a main fluid-reservoir having a source of supply, of a surrounding tank or chamber forming an outside brace to the reservoir, power-transmitting wheels mounted on the chamber, pipes leading from the reservoir and supplying the wheels, and exhaust-pipes leading from the wheels to the chamber, substantially as herein set forth.

4. In a power apparatus, the combination, with a main fluid-reservoir having a source of supply, of a surrounding exhaust-chamber having an outlet, turbine wheels mounted on the exhaust-chamber, pipes connecting the wheels to the tank for fluid-supply, pipes connecting the wheels to the chamber for exhaust, and gearing transmitting the power of the wheels, substantially as herein set forth.

5. In a power apparatus, the main fluid-reservoir made of two or more tanks having a communicating opening in abutting walls which form transverse braces and provided with a source of supply, combined with a surrounding exhaust tank or chamber forming an outside brace to the reservoir, substantially as herein set forth.

PATRICK J. DALTON.

Witnesses:
HENRY L. GOODWIN,
C. SEDGWICK.